United States Patent [19]

Inoue

[11] Patent Number: 4,581,514
[45] Date of Patent: Apr. 8, 1986

[54] WIRE STATE OF USE INDICATION APPARATUS FOR TRAVELING-WIRE ELECTROEROSION MACHINES

[75] Inventor: Kiyoshi Inoue, Tokyo, Japan

[73] Assignee: Inoue-Japax Research Incorporated, Kanagawaken, Japan

[21] Appl. No.: 501,777

[22] Filed: Jun. 7, 1983

[30] Foreign Application Priority Data

Jun. 8, 1982 [JP] Japan .............................. 57-85095[U]

[51] Int. Cl.[4] .............................................. B23H 7/02
[52] U.S. Cl. .............................. 219/69 W; 204/129.2; 204/225; 219/69 C; 242/57
[58] Field of Search ................ 219/69 W, 69 S, 69 C, 219/69 M; 204/129.2, 225; 242/57

[56] References Cited

U.S. PATENT DOCUMENTS

| 3,591,761 | 7/1971 | Bederman et al. | 219/69 C |
| 3,601,572 | 8/1971 | Check | 219/69 M |
| 3,850,384 | 11/1974 | Priest | 242/57 |
| 3,913,519 | 10/1975 | Sugano | 242/57 |
| 4,051,422 | 9/1977 | Lavrentiev et al. | 219/69 W |
| 4,233,486 | 11/1980 | Inoue | 219/69 W |
| 4,286,487 | 9/1981 | Rubel | 242/57 |
| 4,298,781 | 11/1981 | Inoue | 219/69 W |
| 4,367,392 | 1/1983 | Giarardin | 219/69 W |
| 4,458,135 | 7/1984 | Guichard et al. | 219/137.31 |
| 4,463,913 | 8/1984 | Sato | 242/57 |

FOREIGN PATENT DOCUMENTS

| 52-61897 | 5/1977 | Japan | 219/69 W |
| 149124 | 9/1982 | Japan | 219/69 W |
| 58-28428 | 2/1983 | Japan | 219/69 W |
| 58-66623 | 4/1983 | Japan | 219/69 M |
| 80/01545 | 8/1980 | PCT Int'l Appl. | 219/69 W |
| 2077649A | 12/1981 | United Kingdom | 219/69 W |
| 856732 | 8/1981 | U.S.S.R. | 219/69 W |

Primary Examiner—Clifford C. Shaw
Assistant Examiner—Geoffrey S. Evans
Attorney, Agent, or Firm—Karl F. Ross; Herbert Dubno

[57] ABSTRACT

A wire state of use indication apparatus for use with a traveling-wire electroerosion cutting machine is disclosed in which a sensing unit instantaneously responds to the rotation of a roller disposed in the wire travel path and rotated with the electrode wire travelling in bearing contact with the roller. The number of the rotations is counted to produce a sensing signal which represents the cumulative number of rotations of the roller a number which in turn represents the amount of the electrode wire which has been drawn out of the wire storage rool by a given time instant during a given cutting operation. A processing circuit is provided to process the sensing signal with an input setting signal representing the amount of the electrode wire stored in the reel prior to the commencement of the cutting operation to produce an output signal which represents the amount of the electrode wire remaining in the reel at that time instant. The sensing unit may also provide a further sensing signal representing the instantaneous rate of rotation of the roller which rate in turn represents the instantaneous rate of drawing the wire out of the reel.

16 Claims, 2 Drawing Figures

WIRE STATE OF USE INDICATION APPARATUS FOR TRAVELING-WIRE ELECTROEROSION MACHINES

FIELD OF THE INVENTION

The present invention relates to traveling-wire electroerosion cutting machines and, more particularly, to a wire state of use indication apparatus for use with such a machine.

BACKGROUND OF THE INVENTION

A traveling-wire electroerosion machine commonly makes use of a continuous electrode wire stored in a wire storage means. The term "wire" is commonly used in the art and hence will be used herein as well to refer to a metallic or other conductive wire, ribbon, filament or tape designed to constitute a continuous traveling tool electrode in the electroerosion cutting system. The electrode wire is mounted on the machine so as to extend continuously between the wire storage means and a wire takeup means through a cutting zone along a predetermined path of wire travel. A wire traction means is commonly provided to continuously draw or pull the electrode wire out of the wire storage means and thus to continuously feed it to travel through the cutting zone and eventually to be collected onto the wire takeup means for disposal. A wire braking means is also provided to maintain taut the electrode wire traveling between the wire storage means and the wire takeup means along the path.

A workpiece is disposed in the cutting zone so as to be traversed by the traveling electrode wire. A machining fluid, typically distilled water, is supplied to the cutting zone while electrical machining current is passed between the traveling electrode wire and the workpiece to electroerosively remove material from the workpiece. As material removal continues, the workpiece is displaced relative to the traveling electrode wire generally transversely thereto along a predetermined cutting path to form a desired cut in the workpiece.

The electrode wire for use with an electroerosion cutting machine as described is commercially available in the form of a supply of the wire having a given length which is, say, wound on a reel. The wire is progressively unwound and consumed as cutting proceeds in a given electroerosion cutting operation. It is convenient and indeed desirable if the machine operator can be made aware of the amount of the electrode wire remaining on the reel at given time, or at each instant of time while the cutting is being carried out. Alternatively, the operator would desirably be advised of the noticed of the time period of cutting period available before the amount of the electrode wire remaining on the reel at such instant is used up.

It has been recognized that notice of such period cannot be given simply because the amount or the cutting period remaining cannot accurately be determined from the cutting period which has elapsed up to each instant during a given cutting operation. In general, in the traveling-wire electroerosion cutting process the rate of travel of the electrode wire or of with drawing the wire from the reel is caused to vary controlledly according to varying conditions in the cutting zone and also to the varying thickness of the workpiece traversed by the traveling electrode wire.

OBJECTS OF THE INVENTION

It is an object of the present invention, therefore, seeks to provide a wire state of use indication apparatus for a traveling-wire electroerosion cutting machine, which apparatus is capable of reliably and accurately indicating the remaining amount of the electrode wire and/or the remaining period for cutting as described. Another object is to provide an apparatus of the type described which is capable of alerting the machine operator when the amount of the electrode wire on the reel is about to be used up.

SUMMARY OF THE INVENTION

The invention is based upon the recognition of the fact that in the path of wire travel of a traveling-wire electroerosion machine as described there are or can be disposed one or more rollers which are rotated with the electrode wire traveling in bearing contact therewith. Such rollers should preferably be rollers which constitute capstan and pinch rollers serving as the wire braking means and disposed between the wire storage and the cutting zone. Alternatively, they may be rollers which constitute capstan and pinch rollers serving as the wire traction means and disposed between the cutting zone and the wire takeup means. Of course, any one or more further rotatable rollers may be disposed along the path of wire travel.

Briefly, a wire state of use indication apparatus constructed according to the invention for use in a traveling-wire electroersion cutting machine as described comprises means (a) responsive to the rotation of one such roller and including means (a1) for producing a sensing signal representing the cumulative number of revolutions of the said one roller which number, in turn, represents generally the amount of the electrode wire which has been withdrawn from the storage means, at an instant of time during the cutting operation since the commencement thereof; means (b) for having an input signal set therein generally representing the amount of the electrode wire stored in the storage means prior to the commencement of the cutting operation; and means (c) connected to means (a) and (b) and including means (c1) for processing said sensing signal with said input signal to produce an output signal representing the amount of the electrode wire remaining in the wire storage means at the said instant of time. Advantageously, means (d) is provided for displaying, substantially concurrently with the said instant of time, the said output signal in numerical form representing the said remaining amount of the electrode wire. The said remaining amount may be displayed the form of a unit of weight or length. Preferably, means (e) is associated with means (c) and operable to produce an alarm signal for alerting the operator of the machine when the said remaining amount of the electrode wire reaches a predetermined minimum value.

According to a further feature of the invention, means (a) further includes means (a2) for producing a further sensing signal representing the rate of rotation of the said one roller which rate in turn represents the rate of withdrawing the electrode wire from the wire storage means at the said instant of time, and means (c) further includes means (c2) responsive to the output signal and the further sensing signal for producing a further output signal representing a maximum period for which the cutting operation is allowed to continue substantially with the said remaining amount of the electrode wire. Advantageously, means (d') is provided for displaying the further output signal in a numerical form representing the said period of time. Preferably, means (e') is associated with means (c) and operable to produce an alarm signal for alerting the operator when the said period is reduced to a predetermined minimum value.

BRIEF DESCRIPTION OF THE DRAWING

These and other features of the present invention as well as advantages thereof will become more readily apparent from the following description when taken with reference to the accompanying drawing in which.

SPECIFIC DESCRIPTION

Figure 1:
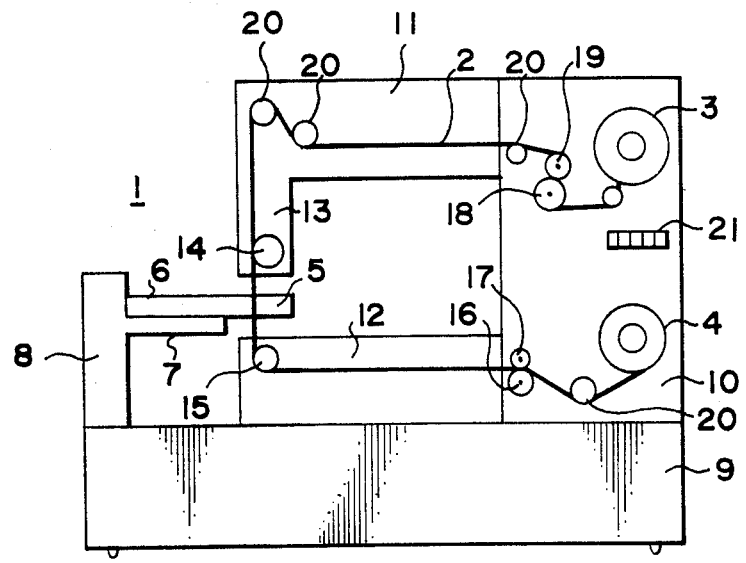
FIG. 1 is an elevational view diagarammatically illustrating a traveling-wire electroerosion cutting machine having a display as a part of an apparatus according to the invention.

Referring now to FIG. 1, the traveling-wire electroerosion cutting machine is generally designated at 1 and makes use of a continuous electrode wire 2 which is withdrawn from or pulled out of a wire supply reel 3. The reel 3 has, prior to a given machining operation, a storage of the electrode wire of a length which is known if the reel is a new wire storage reel furnished from its supplier or has a wire storage partly consumed in a previous machining operation conducted on the machine and utilizing an apparatus of the invention as will be described.

The electrode wire 2 released from the wire storage reel 3 is shown as extending continuously between the reel 3 and a wire takeup reel 4 through a cutting zone 5 in which a workpiece 6 is disposed. The workpiece 6 is carried on a worktable 7 which is typically displaceable by a pair of motors (not shown) to displace the workpiece 6 in a horizontal plane. The worktable 7 is movably supported by a stand 8 securely mounted on a bed 9 of the machine 1. The wire supply reel 3 and the wire takeup reel 4 are rotatably mounted on a machine column 10 standing upright and securely mounted on the bed 9. Extending from the column 10 are parallel arms 11 and 12 of which the upper arm 11 has a downward extension 13 at its end portion. The cutting zone 5 is defined between guide roller 14 and 15 secured to the downward extension 13 of the upper arm 11 and the end portion of the lower arm 12, respectively.

A roller set of a capstan 16 and a pinch roller 17 is disposed downstream of the guide roller 15 and, with the capstan 16 driven by a motor (not shown), serves as wire traction means for continuously withdrawing or pulling the electrode wire 2 out of the storage reel 3 to feed it to travel through the cutting zone 5 and eventually to be collected onto the wire takeup means 4 in an electroerosion cutting operation. A roller set of a capstan 18 and pinch roller 19 is disposed between the storage reel 3 and the guide roller 14 in the path of wire travel and, with the capstan 18 driven by a motor (not shown), serves as wire braking means for maintaining taut the electrode wire traveling between the storage reel 3 and the takeup reel 4 along the path of wire travel. Further rolls or rollers 20 are also provided to properly guide the electrode wire 2 to travel along the said path. A display panel 21 is shown also attached to the column 21 of the machine for displaying in numerical form a wire state of use signal produced in the apparatus as will be described.

Figure 2:
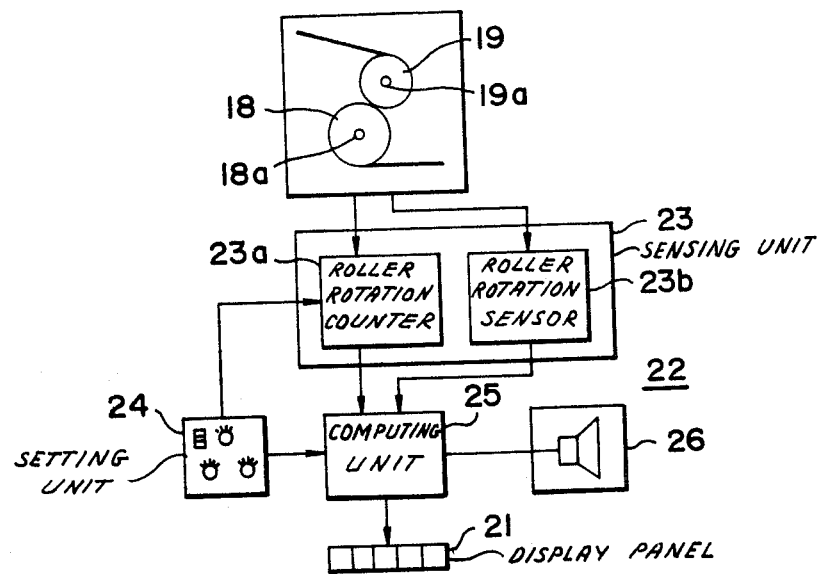
FIG. 2 is a schematic view, essentially in a block-diagram form, illustrating a combination of means constituting an apparatus according to the invention.

The wire state of use indication apparatus embodying the invention is generally designated at 22 in FIG. 2. The apparatus comprises a sensing unit 23, a setting unit 24, a processing (computing) unit 25 and the display panel 21.

The sensing unit 23 is here designed to sense the rotation of one of the capstan 18 and the pinch roller 19 rotated about axes 18a and 19a respectively and serving as the wire braking means, but may sense the rotation of one of the capstan 16 and the pinch roller 17 or of any other roller disposed in the said path and rotated by the electrode wire 2 in bearing contact therewith.

The sensing unit 23 has a sub-unit 23a including an encoder (not shown) for sensing the number of revolutions of the capstan 18 or roller, 19. A signal representing the number of rotation is used in the sensing unit 23a including a counter to derive, at a given or at each instant of, time during the cutting operation, a signal representing the cumulative number of revolutions of the roller up to that time instant since the commencement of the cutting operation. It will be seen that this cumulative number is proportional to the amount of the electrode wire 2 which has been withdrawn from or pulled out of the storage reel 3 at that instant during the cutting operation. Prior to the commencement of the cutting operation, a start input is applied at the setting unit 24 to clear all counts previously accumulated in the counter.

The setting unit 24 has an input signal previously stored therein which represents the amount of the electrode wire stored on the reel 3 prior to the commencement of the cutting operation. The input signal and the signal from the sensing sub-unit 23a are combined by the processing circuit 25 to produce an output signal which represents the amount of the electrode wire remaining stored on the reel 3 at that instant. The display 21 is operated, substantially concurrently with that instant, to display the output signal in numerical form representing that remaining amount of the electrode wire 2, which amount may be displayed as a weight (e.g. grams) or length unit (e.g. meters).

The sensing unit 23 may also have a sub-unit 23b including an encoder (not shown) for sensing the rate of rotation of the roller 18, 19. It will be seen that the rate of rotation is proportional to the instantaneous rate of withdrawing the electrode wire from the storage reel 3 and, by combining the input signal from the setting unit 24 (representing the amount of the electrode wire 2 stored on the reel 3 prior to the commencement of the cutting operation), the output signal from the sensing sub-unit 23a (representing that remaining amount of the electrode wire) and the output signal from the sensing sub-unit 23b (representing the instantaneous rate of rotation of the roller) in the processing unit 25, there results an output signal which represents a maximum time period for which the cutting operation can be continued with that remaining amount of the electrode wire. The display 21 is operated, substantially concurrently with the said instant of time, to display that remaining period in a numerical form. The period is displayed in a unit of hours or minutes.

The apparatus 22 may also include an alarm unit 26 associated with an output of the processing unit 25 to provide an audible and or visible signal for alerting the operator therewith when the remaining amount of the electrode wire or the remaining time period is reduced to a predetermined minimum level.

The display 21 may be operated on an instantaneous basis or an instantaneous mode while the sensing unit 23 and the processing unit 25 is operating instantaneously. Accordingly, the operator can be kept, at all times, informed visibly of the remaining amount of the electrode wire or the remaining time period for which a given cutting operation is allowed to be continued with the remaining amount of the electrode wire. Thus, if the wire stored on the reel 3 is found to be insufficient after a cutting operation is commenced, he can interrupt the operation to replace the reel by a storage reel containing an adequate amount of wire. Also, by operation to replace a proper storage reel therefor. Also, by virtue of the provision of the alarm unit 26, the operator is alerted to interrupt the cutting operation when necessary. Furthermore, the operator can, at the end of a given cutting operation, ascertain conveniently the precise, amount of the electrode wire precisely remaining on the reel for one or more subsequent cutting operations.

What is claimed is:

1. A wire state of use indication apparatus for a traveling-wire electroerosion cutting machine having:
   a continuous electrode wire stored in a wire storage means for extending continuously between the storage means and a wire takeup means through a cutting zone along a predetermined path of wire travel,
   wire traction means for continuously withdrawing the electrode wire from the wire storage means to feed it to travel through the cutting zone and eventually to be collected onto the wire takeup means in an electroerosion cutting operation,
   wire braking means for maintaining taut the electrode wire traveling between the wire storage means and the wire takeup means along said path, and
   a plurality of rollers disposed in said path of wire travel for rotating with the electrode wire traveling in bearing contact therewith in the electroerosion cutting operation,
   the apparatus comprising:
   means (a) responsive to the rotation of one of said rollers and including means (a1) for producing a sensing signal representing a cumulative amount of the electrode wire which has been withdrawn from said storage means substantially at every given instant of time during said cutting operation since the commencement thereof;
   means (b) for having an input signal set therein generally representing an amount of the electrode wire stored in said storage means immediately prior to the commencement of said cutting operation;
   means (c) connected to means (a) and (b) and including means (c1) for processing said sensing signal with said input signal to produce an output signal representing an amount of the electrode wire remaining in said storage means at said given instant of time; and
   means (d) for displaying, substantially without delay at said instant of time, said output signal in numerical form representing said remaining amount of the electrode wire.

2. The apparatus defined in the form of claim wherein said remaining amount is displayed in a unit of weight.

3. The apparatus defined in claim 1 wherein said remaining amount is displayed in the form of a unit of length.

4. The apparatus defined in claim 1, further comprising means (e) associated with means (c) and operable to produce an alarm signal for alerting the operator of the machine when said remaining amount of the electrode wire is reduced to a predetermined minimum amount.

5. The apparatus defined in claim 1 wherein said one roller is one of a capstan and a pinch roller in a set which constitutes said wire braking means and is disposed between said wire storage means and said cutting zone.

6. The apparatus defined in claim 1 wherein said means (a) further includes means (a2) for producing a further sensing signal representing the rate of withdrawing the electrode wire from said storage means at said every given instant of time, and means (c) further includes means (c2) responsive to said output signal representing a maximum period for which said cutting operation is allowed to continue with said remaining amount of the electrode wire.

7. The apparatus defined in claim 6, further comprising means (d') for displaying said further output signal in numerical form representing said period.

8. The apparatus defined in claim 6 or claim 7 wherein said one roller is one of a pair of rollers which together constitute said wire braking means and are disposed between said wire storage means and said cutting zone in said path.

9. The apparatus defined in claim 6 or claim 7 wherein said one roller is one of a capstan and a pinch roller which together constitute said wire traction means and are disposed between said cutting zone and said takeup means in said path.

10. A wire state of use indication apparatus for a traveling-wire electroerosion cutting machine having:
    a continuous electrode wire stored in a wire storage means for extending continuously between the storage means and a wire takeup means through a cutting zone along a predetermined path of wire travel,
    wire traction means for continuously withdrawing the electrode wire from the wire storage means to feed it to travel through the cutting zone and eventually to be collected onto the wire takeup means in an electroerosion cutting operation,
    wire braking means for maintaining taut the electrode wire traveling between the wire storage means and the wire takeup means along said path, and
    a plurality of rollers disposed in said path of wire travel for rotating with the electrode wire traveling in bearing contact therewith in the electroerosion cutting operation,
    the apparatus comprising:
    means (a) responsive to the rotation of one of said rollers and including means (a1) for producing a sensing signal representing a cumulative number of revolutions of said one roller which number, in turn, represents generally the amount of the electrode wire withdrawn from said storage means, substantially at said given instant of time during said cutting operation since the commencement thereof;
    means (b) for having an input signal set therein generally representing an amount of the electrode wire stored in said storage means prior to the commencement of said cutting operation; and
    means (c) connected to means (a) and (b) and including means (c1) for processing said sensing signal with said input signal to produce an output signal representing an amount of the electrode wire remaining in said storage means at said given instant of time, said means (a) further including means (a2) for producing a further sensing signal representing the rate of rotation of said one roller which rate, in turn, represents the rate of withdrawing the electrode wire from said storage means, at said given instant of time, and means (c) further including means (c2) responsive to said output signal and said further sensing signal for producing a further output signal representing a maximum period for which said cutting operation is allowed to continue with said remaining amount of the electrode wire.

11. The apparatus defined in claim 10, further comprising means (d') for displaying said further output signal in numerical form representing said period.

12. A wire state of use indication apparatus for a traveling-wire electroerosion cutting machine having:
   a continuous electrode wire stored in a wire storage means for extending continuously between the storage means and a wire takeup means through a cutting zone along a predetermined path of wire travel,
   wire traction means for continuously withdrawing the electrode wire from the wire storage means to feed it to travel through the cutting zone and eventually to be collected onto the wire takeup means in an electroerosion cutting operation,
   wire braking means for maintaining taut the electrode wire traveling between the wire storage means and the wire takeup means along said path, and
   a plurality of rollers disposed in said path of wire travel and including those constituting said traction means and said braking means for rotating with the electrode wire traveling in bearing contact therewith in the electroerosion cutting operation,
   the apparatus comprising:
   means (a) responsive to the rotation of one of said rollers and including means (a1) for producing a sensing signal representing a cumulative number of rotations of said one roller substantially up to each given instant of time during said cutting operation from the commencement thereof;
   means (b) for having an input signal set therein generally representing an amount of the electrode wire stored in said storage means immediately prior to said commencement;
   means (c) connected to means (a) and (b) and including means (c1) for processing said sensing signal with said input signal to produce an output signal representing an amount of the electrode wire remaining in said storage means at said given instant of time; and
   means (d) for displaying substantially instantaneously upon development thereof said output signal in numerical form representing said remaining amount of the electrode wire.

13. The apparatus defined in claim 12 wherein said means (a) further includes means (a2) for producing a further sensing signal representing the rate of rotation of said one roller at said each given instant of time, and means (c) further includes means (c2) responsive to said output signal and said further sensing signal for producing a further output signal representing a maximum period for which said cutting operation is allowed to continue with said remaining amount of the electrode wire.

14. The apparatus defined in claim 13, further comprising means (d') for displaying said further output signal in numerical form representing said period.

15. A wire state of use indication apparatus for a traveling-wire electroerosion cutting machine having:
   a continuous electrode wire stored in a wire storage means for extending continuously between the storage means and a wire takeup means through a cutting zone along a predetermined path of wire travel,
   wire traction means for continuously withdrawing the electrode wire from the wire storage means to feed it to travel through the cutting zone and eventually to be collected onto the wire takeup means in an electroerosion cutting operation,
   wire braking means for maintaining taut the electrode wire traveling between the wire storage means and the wire takeup means along said path, and
   more than one roller disposed in said path of wire travel including those constituting said traction means and said braking means for rotating with the electrode wire traveling in bearing contact therewith in the electroerosion cutting operation,
   the apparatus comprising:
   means (a) responsive to the rotation of one of said rollers for producing a first signal representing a cumulative amount of the electrode wire which has been withdrawn from said storage means at each given instant of time during said cutting operation since the commencement thereof;
   means (b) for having a second signal set therein representing an amount of the electrode wire stored in said storage means immediately prior to said commencement;
   means (c) responsive to the rotation of said one roller for producing a third signal representing a rate of withdrawing the electrode wire from said storage means at said given instant of time;
   means (d) connected to said means (a), (b), and (c) and responsive to said first, second and third signals for deriving therefrom an output signal representing a time period for which said cutting operation is allowed at said given instant of time to continue with an amount of the electrode wire then remaining in said storage means; and
   means (e) connected to means (d) for displaying said output signal in numerical form representing said time period.

16. The apparatus defined in claim 15, further comprising means (f) associated with means (d) and operable to produce an alarm signal for alerting the operator of the machine when said time period is reduced to a predetermined value.

* * * * *